US010070437B2

United States Patent
McHenry et al.

(10) Patent No.: US 10,070,437 B2
(45) Date of Patent: Sep. 4, 2018

(54) METHODS FOR USING A DETECTOR TO MONITOR AND DETECT CHANNEL OCCUPANCY

(71) Applicant: Shared Spectrum Company, Vienna, VA (US)

(72) Inventors: Mark Allen McHenry, McLean, VA (US); Dmitry Dain, Herndon, VA (US); Eugene Livis, Vienna, VA (US); Karl Steadman, Arlington, VA (US); Olga Ritterbush, Arlington, VA (US)

(73) Assignee: Shared Spectrum Company, Vienna, VA (US)

( * ) Notice: Subject to any disclaimer, the term of this patent is extended or adjusted under 35 U.S.C. 154(b) by 0 days.

(21) Appl. No.: 15/297,752

(22) Filed: Oct. 19, 2016

(65) Prior Publication Data

US 2017/0201983 A1    Jul. 13, 2017

Related U.S. Application Data

(63) Continuation of application No. 14/932,181, filed on Nov. 4, 2015, now Pat. No. 9,491,636, which is a
(Continued)

(51) Int. Cl.
*H04W 72/04* (2009.01)
*H04W 56/00* (2009.01)
(Continued)

(52) U.S. Cl.
CPC ...... *H04W 72/0446* (2013.01); *H04B 7/0647* (2013.01); *H04W 56/003* (2013.01); *H04B 17/14* (2015.01); *H04B 17/318* (2015.01)

(58) Field of Classification Search
CPC .... H04B 7/0647; H04B 17/14; H04B 17/318; H04L 1/20
See application file for complete search history.

(56) References Cited

U.S. PATENT DOCUMENTS

| 3,893,064 A | 7/1975 | Nishihara et al. |
| 3,935,572 A | 1/1976 | Broniwitz et al. |

(Continued)

FOREIGN PATENT DOCUMENTS

| EP | 1220499 A2 | 7/2002 |
| GB | 2260879 A | 4/1993 |

(Continued)

OTHER PUBLICATIONS

Ackland, High Performance Cognitive Radio Platform with Integrated Physical and Network Layer Capabilities, Interim Technical Report, Network Centric Cognitive Radio, Jul. 2005.
(Continued)

*Primary Examiner* — Raj Jain
(74) *Attorney, Agent, or Firm* — Morris & Kamlay LLP

(57) ABSTRACT

Methods for using a detector to monitor and detect channel occupancy are disclosed. The detector resides on a station within a network using a framed format having a periodic time structure. When non-cooperative transmissions are detected by the network, the detector assesses the availability of a backup channel enabling migration of the network. The backup channel serves to allow the network to migrate transparently when the current channel becomes unavailable. The backup channel, however, could be occupied by another network that results in the migrating network interfering with the network already using the backup channel. Thus, the detector detects active transmission sources on the backup channel to determine whether the backup channel is occupied. Methods for using the detector include scheduling detection intervals asynchronously. The asynchronous detection uses offsets from a reference point within a frame.

20 Claims, 6 Drawing Sheets

US 10,070,437 B2

Page 2

Related U.S. Application Data continuation of application No. 14/636,314, filed on Mar. 3, 2015, now Pat. No. 9,215,710, which is a continuation of application No. 13/914,038, filed on Jun. 10, 2013, now Pat. No. 9,288,684, which is a continuation of application No. 13/228,882, filed on Sep. 9, 2011, now Pat. No. 8,559,301, which is a continuation of application No. 11/582,496, filed on Oct. 18, 2006, now Pat. No. 8,027,249.

(51) Int. Cl.
   *H04B 7/06* (2006.01)
   *H04B 17/14* (2015.01)
   *H04B 17/318* (2015.01)

(56) References Cited

U.S. PATENT DOCUMENTS

| | | |
|---|---|---|
| 4,107,613 A | 8/1978 | Queen et al. |
| 4,119,964 A | 10/1978 | Johannsen et al. |
| 4,227,255 A | 10/1980 | Carrick et al. |
| 4,305,150 A | 12/1981 | Richmond et al. |
| 4,398,220 A | 8/1983 | Satoh |
| 4,501,020 A | 2/1985 | Wakeman |
| 4,672,657 A | 6/1987 | Dershowitz |
| 4,736,453 A | 4/1988 | Schloemer |
| 4,783,780 A | 11/1988 | Alexis |
| 4,803,703 A | 2/1989 | DeLuca et al. |
| 4,878,238 A | 10/1989 | Rash et al. |
| 4,881,271 A | 11/1989 | Yamauchi et al. |
| 4,918,730 A | 4/1990 | Schulze |
| 4,977,612 A | 12/1990 | Wilson |
| 5,040,238 A | 8/1991 | Comroe et al. |
| 5,093,924 A | 3/1992 | Toshiyuki et al. |
| 5,093,927 A | 3/1992 | Shanley |
| 5,142,690 A | 8/1992 | McMullan, Jr. et al. |
| 5,142,691 A | 8/1992 | Freeburg et al. |
| 5,151,747 A | 9/1992 | Nourrcier |
| 5,155,590 A | 10/1992 | Beyers, II et al. |
| 5,162,937 A | 11/1992 | Heidemann et al. |
| 5,177,604 A | 1/1993 | Martinez |
| 5,177,767 A | 1/1993 | Kato |
| 5,179,722 A | 1/1993 | Gunmar et al. |
| 5,203,012 A | 4/1993 | Patsiokas et al. |
| 5,225,902 A | 7/1993 | McMullan, Jr. |
| 5,239,676 A | 8/1993 | Strawczynski et al. |
| 5,247,701 A | 9/1993 | Comroe et al. |
| 5,260,974 A | 11/1993 | Johnson et al. |
| 5,271,036 A | 12/1993 | Lobert et al. |
| 5,276,908 A | 1/1994 | Koohgoli et al. |
| 5,325,088 A | 6/1994 | Rauf |
| 5,375,123 A | 12/1994 | Andersson et al. |
| 5,402,523 A | 3/1995 | Berg |
| 5,410,737 A | 4/1995 | Jones |
| 5,412,658 A | 5/1995 | Arnold et al. |
| 5,422,912 A | 6/1995 | Asser et al. |
| 5,422,930 A | 6/1995 | McDonald et al. |
| 5,428,819 A | 6/1995 | Wang et al. |
| 5,448,753 A | 9/1995 | Ahl et al. |
| 5,475,868 A | 12/1995 | Duque-Anton et al. |
| 5,497,505 A | 3/1996 | Koohgoli et al. |
| 5,502,688 A | 3/1996 | Recchione et al. |
| 5,511,233 A | 4/1996 | Otten |
| 5,548,809 A | 8/1996 | Lemson |
| 5,553,081 A | 9/1996 | Downey et al. |
| 5,585,850 A | 12/1996 | Schwaller |
| 5,608,727 A | 3/1997 | Perreault et al. |
| 5,655,217 A | 8/1997 | Lemson |
| 5,668,747 A | 9/1997 | Ohashi |
| 5,748,678 A | 5/1998 | Valentine et al. |
| 5,752,164 A | 5/1998 | Jones |
| 5,794,151 A | 8/1998 | McDonald et al. |
| 5,822,686 A | 10/1998 | Lundberg et al. |
| 5,828,948 A | 10/1998 | Almgren et al. |
| 5,850,605 A | 12/1998 | Souissi et al. |
| 5,862,487 A | 1/1999 | Fujii et al. |
| 5,884,181 A | 3/1999 | Arnold et al. |
| 5,889,821 A | 3/1999 | Arnstein et al. |
| 5,939,887 A | 8/1999 | Schmidt et al. |
| 5,943,622 A | 8/1999 | Yamashita |
| 5,960,351 A | 9/1999 | Przelomiec |
| 5,999,561 A | 12/1999 | Naden et al. |
| 6,011,970 A | 1/2000 | McCarthy |
| 6,044,090 A | 3/2000 | Grau et al. |
| 6,047,175 A | 4/2000 | Trompower |
| 6,049,707 A | 4/2000 | Buer et al. |
| 6,049,717 A | 4/2000 | Dufour et al. |
| 6,141,557 A | 10/2000 | Dipiazza |
| 6,147,553 A | 11/2000 | Kolanek |
| 6,154,501 A | 11/2000 | Friedman |
| 6,157,811 A | 12/2000 | Dent |
| 6,178,328 B1 | 1/2001 | Tang et al. |
| 6,188,873 B1 | 2/2001 | Wickman et al. |
| 6,208,858 B1 | 3/2001 | Antonio et al. |
| 6,240,274 B1 | 5/2001 | Izadpanah |
| 6,269,331 B1 | 7/2001 | Alanara et al. |
| 6,295,289 B1 | 9/2001 | Ionescu et al. |
| 6,304,140 B1 | 10/2001 | Thron et al. |
| 6,356,555 B1 | 3/2002 | Rakib et al. |
| 6,380,879 B2 | 4/2002 | Kober et al. |
| 6,522,885 B1 | 2/2003 | Tang et al. |
| 6,526,264 B2 | 2/2003 | Sugar et al. |
| 6,529,715 B1 | 3/2003 | Kitko et al. |
| 6,570,444 B2 | 5/2003 | Wright |
| 6,597,301 B2 | 7/2003 | Cerra |
| 6,606,593 B1 | 8/2003 | Jarvinen et al. |
| 6,615,040 B1 | 9/2003 | Benveniste |
| 6,625,111 B1 | 9/2003 | Sudo |
| 6,671,503 B1 | 12/2003 | Niwamoto |
| 6,675,012 B2 | 1/2004 | Gray |
| 6,687,492 B1 | 2/2004 | Sugar et al. |
| 6,690,746 B1 | 2/2004 | Sills et al. |
| 6,697,436 B1 | 2/2004 | Wright et al. |
| 6,700,450 B2 | 3/2004 | Rogers |
| 6,714,605 B2 | 3/2004 | Sugar et al. |
| 6,714,780 B1 | 3/2004 | Antonio et al. |
| 6,728,517 B2 | 4/2004 | Sugar et al. |
| 6,771,957 B2 | 8/2004 | Chitrapu |
| 6,785,520 B2 | 8/2004 | Sugar et al. |
| 6,792,268 B1 | 9/2004 | Benveniste et al. |
| 6,799,020 B1 | 9/2004 | Heidmann et al. |
| 6,816,832 B2 | 11/2004 | Alanara et al. |
| 6,847,678 B2 | 1/2005 | Berezdivin et al. |
| 6,850,735 B2 | 2/2005 | Sugar et al. |
| 6,850,764 B1 | 2/2005 | Patel |
| 6,862,456 B2 | 3/2005 | Sugar et al. |
| 6,904,269 B1 | 6/2005 | Deshpande et al. |
| 6,917,789 B1 * | 7/2005 | Moloudi ............ H03B 21/01 333/103 |
| 6,941,110 B2 | 9/2005 | Kloper et al. |
| 6,952,563 B2 | 10/2005 | Brown et al. |
| 6,959,178 B2 | 10/2005 | Macedo et al. |
| 6,965,762 B2 | 11/2005 | Sugar et al. |
| 6,973,059 B1 | 12/2005 | Borst et al. |
| 6,990,087 B2 | 1/2006 | Rao et al. |
| 6,993,440 B2 | 1/2006 | Anderson et al. |
| 7,013,345 B1 | 3/2006 | Brown et al. |
| 7,035,593 B2 | 4/2006 | Miller et al. |
| 7,054,625 B2 | 5/2006 | Kawasaki et al. |
| 7,058,383 B2 | 6/2006 | Sugar et al. |
| 7,089,014 B2 | 8/2006 | Brown et al. |
| 7,227,974 B2 | 6/2007 | Kamijo et al. |
| 7,260,156 B2 | 8/2007 | Krupezevic et al. |
| 7,269,151 B2 | 9/2007 | Diener et al. |
| 7,313,393 B2 | 12/2007 | Chitrapu |
| 7,342,876 B2 | 3/2008 | Bellur et al. |
| 7,424,268 B2 | 9/2008 | Diener et al. |
| 7,428,270 B1 | 9/2008 | Dubuc et al. |
| 7,457,295 B2 | 11/2008 | Saunders et al. |
| 7,463,952 B2 | 12/2008 | Bidou et al. |
| 7,483,700 B2 | 1/2009 | Buchwald et al. |
| 7,509,097 B2 | 3/2009 | Irie et al. |
| 7,532,857 B2 | 5/2009 | Simon |

(56) References Cited

U.S. PATENT DOCUMENTS

| | | | |
|---|---|---|---|
| 7,564,816 B2 | 7/2009 | McHenry et al. | |
| 7,610,036 B2 | 10/2009 | Teo et al. | |
| 7,613,148 B2 | 11/2009 | Hong et al. | |
| 7,616,604 B2 | 11/2009 | Abdelhamid et al. | |
| 7,742,764 B2 | 6/2010 | Gillig et al. | |
| 7,826,839 B1 | 11/2010 | Nicholas | |
| 7,917,113 B2 | 3/2011 | Palenius et al. | |
| 2001/0013834 A1 | 8/2001 | Yamazaki | |
| 2001/0046843 A1 | 11/2001 | Alanara et al. | |
| 2002/0002052 A1 | 1/2002 | McHenry | |
| 2002/0073223 A1* | 6/2002 | Darnell | H04L 12/423 709/232 |
| 2002/0085527 A1* | 7/2002 | Song | H04B 1/7083 370/337 |
| 2002/0196842 A1 | 12/2002 | Onggosanusi et al. | |
| 2003/0020651 A1 | 1/2003 | Crilly, Jr. et al. | |
| 2003/0027577 A1 | 2/2003 | Brown et al. | |
| 2003/0081628 A1 | 5/2003 | Sugar et al. | |
| 2003/0099218 A1 | 5/2003 | Tillotson | |
| 2003/0165187 A1 | 9/2003 | Tesfai et al. | |
| 2003/0181173 A1 | 9/2003 | Sugar et al. | |
| 2003/0181211 A1 | 9/2003 | Razavilar et al. | |
| 2003/0181213 A1 | 9/2003 | Sugar et al. | |
| 2003/0198200 A1 | 10/2003 | Diener et al. | |
| 2003/0203743 A1 | 10/2003 | Sugar et al. | |
| 2004/0017268 A1 | 1/2004 | Rogers | |
| 2004/0023674 A1 | 2/2004 | Miller | |
| 2004/0047324 A1 | 3/2004 | Diener | |
| 2004/0072546 A1 | 4/2004 | Sugar et al. | |
| 2004/0095907 A1 | 5/2004 | Agee et al. | |
| 2004/0121753 A1 | 6/2004 | Sugar et al. | |
| 2004/0136466 A1 | 7/2004 | Tesfai et al. | |
| 2004/0142696 A1 | 7/2004 | Saunders et al. | |
| 2004/0203474 A1 | 10/2004 | Miller et al. | |
| 2005/0070294 A1 | 3/2005 | Lyle et al. | |
| 2005/0119006 A1 | 6/2005 | Cave et al. | |
| 2005/0192011 A1 | 9/2005 | Hong et al. | |
| 2005/0213580 A1 | 9/2005 | Mayer et al. | |
| 2005/0213763 A1 | 9/2005 | Owen et al. | |
| 2005/0270218 A1 | 12/2005 | Chiodini | |
| 2006/0023915 A1* | 2/2006 | Aalbu | G01S 13/04 382/103 |
| 2006/0075467 A1 | 4/2006 | Sanda et al. | |
| 2006/0211395 A1 | 9/2006 | Waltho | |
| 2006/0220944 A1 | 10/2006 | Ikeda | |
| 2006/0234716 A1 | 10/2006 | Vesterinen et al. | |
| 2006/0246836 A1 | 11/2006 | Simon | |
| 2006/0247505 A1 | 11/2006 | Siddiqui | |
| 2007/0008875 A1 | 1/2007 | Gerhardt et al. | |
| 2007/0019603 A1 | 1/2007 | Gerhardt et al. | |
| 2007/0046467 A1 | 3/2007 | Chakraborty et al. | |
| 2007/0047474 A1 | 3/2007 | Anderson | |
| 2007/0053410 A1 | 3/2007 | Mahonen et al. | |
| 2007/0070939 A1* | 3/2007 | Hottinen | H04B 7/0647 370/328 |
| 2007/0076745 A1* | 4/2007 | Manjeshwar | H04L 1/1803 370/448 |
| 2007/0091839 A1 | 4/2007 | Abdelhamid et al. | |
| 2007/0091998 A1 | 4/2007 | Woo et al. | |
| 2007/0100922 A1 | 5/2007 | Ashish | |
| 2007/0165577 A1 | 7/2007 | Baker et al. | |
| 2007/0165664 A1 | 7/2007 | Gerhardt et al. | |
| 2007/0165695 A1 | 7/2007 | Gerhardt et al. | |
| 2007/0183338 A1 | 8/2007 | Singh et al. | |
| 2007/0232309 A1 | 10/2007 | Koszarsky | |
| 2007/0253394 A1 | 11/2007 | Horiguchi et al. | |
| 2007/0254596 A1 | 11/2007 | Corson et al. | |
| 2008/0010040 A1 | 1/2008 | McGehee | |
| 2008/0014880 A1 | 1/2008 | Hyon et al. | |
| 2008/0031143 A1 | 2/2008 | Ostrosky | |
| 2008/0069079 A1 | 3/2008 | Jacobs | |
| 2008/0075145 A1 | 3/2008 | Balachandran et al. | |
| 2008/0095042 A1 | 4/2008 | McHenry et al. | |
| 2008/0228446 A1 | 9/2008 | Baraniuk et al. | |
| 2008/0259859 A1 | 10/2008 | Cordeiro et al. | |
| 2008/0261537 A1 | 10/2008 | Chen | |
| 2008/0267259 A1 | 10/2008 | Budampati et al. | |
| 2008/0284648 A1 | 11/2008 | Takada et al. | |
| 2009/0040986 A1 | 2/2009 | Cordeiro et al. | |
| 2009/0074033 A1 | 3/2009 | Kattwinkel | |
| 2009/0092075 A1* | 4/2009 | Corson | H04W 76/023 370/328 |
| 2009/0161610 A1 | 6/2009 | Kang et al. | |
| 2009/0190508 A1 | 7/2009 | Kattwinkel | |
| 2009/0252178 A1 | 10/2009 | Huttunen et al. | |
| 2010/0008312 A1 | 1/2010 | Viswanath | |
| 2010/0041338 A1 | 2/2010 | Hannagan | |
| 2010/0105332 A1 | 4/2010 | McHenry et al. | |
| 2010/0220618 A1 | 9/2010 | Kwon et al. | |
| 2010/0296078 A1 | 11/2010 | Forrer et al. | |
| 2011/0051645 A1 | 3/2011 | Hong et al. | |

FOREIGN PATENT DOCUMENTS

| | | |
|---|---|---|
| WO | WO-2003026218 A1 | 3/2003 |
| WO | WO-2004054280 A2 | 6/2004 |
| WO | WO-2006101489 A1 | 9/2006 |
| WO | WO-2007034461 A2 | 3/2007 |
| WO | WO-2007058490 A1 | 5/2007 |
| WO | WO-2007094604 A1 | 8/2007 |
| WO | WO-2007096819 A2 | 8/2007 |
| WO | WO-2007108963 A2 | 9/2007 |
| WO | WO-2007108966 A2 | 9/2007 |
| WO | WO-2007109169 A2 | 9/2007 |
| WO | WO-2007109170 A2 | 9/2007 |

OTHER PUBLICATIONS

Adaptive Spectrum Technology: Findings From the DARPA XG Project, Feb. 23, 2007.
Anticipated XG VIP Demo Invitees, Jun. 28, 2006.
Cabric et al. "Implementation issues in spectrum sensing for cognitive radios" Signals Systems and Computers, 2004. Conference record of the 38th Asilomar Conference on Pacific Grove, CA, USA, Nov. 7-10, 2004, NJ, USA, vol. 1, pp. 772-776, sections I-IV, Nov. 7, 2004.
PCT Office Communication in the PCT application No. PCT/US2008/073193 dated Jun. 2, 2009.
Supplementary European Search Report in the European Application No. 01 94 5944 dated Apr. 24, 2009.
The International Search Report dated Mar. 18, 2008, issued in corresponding International Application No. PCT/US07/11414.
The International Search Report dated Sep. 28, 2009, issued in corresponding International Application No. PCT/US08/073194.
The International Search Report, dated Mar. 25, 2005, in related International Application No. PCT/US04/17883, filed Jun. 9, 2004.
Ditri et al., Dynamic spectrum access moves to the forefront, Apr. 2008.
Dynamic Spectrum Sharing Bid, Lease & MVNO/MVNE: Spectrum Options for Operators, WCA 2006, Jun. 29, 2006.
Dynamic Spectrum Sharing Presentation, Jan. 25, 2005.
ERPEK, Location-based Propagation Modeling for Opportunistic Spectrum Access in Wireless Networks, Dec. 7, 2007.
ESR for EP 07839537.3, dated Apr. 29, 2013.
Falconer, D. et al., "Frequency Domain Equalization for Single-Carrier Broadband Wireless Systems", IEEE Communications Magazine (Apr. 2002).
International Search Report for PCT/US01/14853 (dated Feb. 8, 2002).
International Search Report for PCT/US07/22356 (dated Oct. 6, 2008).
International Search Report for PCT/US07/21940 (dated Feb. 14, 2008).
Leu et el. Ultra sensitive TV detector measurements, 2005 First IEEE International Symposium on New Frontiers in Dynamic Spectrum Access Networks (DySPAN 2005), Nov. 2005, pp. 30-36.
Mahbubani et al., Dynamic channel allocation in wireless ad-hoc networks, University of California. San Diego, Jun. 13, 2007, pp. 1-12.

(56) References Cited

OTHER PUBLICATIONS

McHenry et al., XG DSA Radio System, 3rd IEEE symposium on New Frontiers in Dynamic Spectrum Access Networks (DySPAN 2008), Oct. 2008, p. 1-11.
McHenry, Creation of a Spectrum Sharing Innovation Test-Bed and the President's Spectrum Policy Initiative Spectrum policy initiative Sharing Innovation Test-Bed, Jul. 2006.
McHenry, The probe spectrum access method, 2005 First IEEE International Symposium on New Frontiers in Dynamic Spectrum Access Networks, 2005. (DySPAN 2005). Nov. 8, 2005, pp. 346-351.
McHenry, XG dynamic spectrum access field test results [Topics in Radio Communications], IEEE Communications Magazine, 2007, 2007 , pp. 51-57 no vol. 45, n: 6.
Ning Han et al., "Spectral correlation based on signal detection method for spectrum sensing in IEEE 802.22 WRAN systems" Advanced Communication Technology, 2006. ICACT 2006. The 8th International Conference, vol. 3, Feb. 20-22, 2006, NJ, USA, pp. 1765-1770.
Notice of Allowance dated Jul. 1, 2016 as received in U.S. Appl. No. 14/932,181.
Perich, Experimental Field Test Results on Feasibility of Declarative Spectrum Management, 3rd IEEE International Symposium on New Frontiers in Dynamic Spectrum Access Networks, (DySPAN, 2008) , Oct. 2008, pp. 1-10.
Perich, Policy-Based Network Management for NeXt Generation Spectrum Access Control, 2nd IEEE International Symposium on New Frontiers in Dynamic Spectrum Access Networks, (DySPAN 2007), Apr. 2007, pp. 496-506.
Ramanathan and Partridge, Next Generation (XG) Architecture and Protocol Development (XAP), Final Technical Report, Aug. 2005.
Rohde, U. L. et al., "RF/Microwave Circuit Design for Wireless Applications", Mar. 2002, ISBN: 0471298182 Wiley-Interscience John Wiley and Sons, Inc., 605 Third Avenue, New York, NY 10158-0012.
Secondary Markets & Spectrum Leasing UTC Telecom 2006, Tampa, FL May 23, 2006.
Seelig, A Description of the Aug. 2006 XG Demonstrations at Fort A.P. Hill, 2nd IEEE International Symposium on New Frontiers in Dynamic Spectrum Access Networks, (DySPAN 2007), Apr. 2007, pp. 1-12.

SSC, Shared Spectrum Company Successfully Demonstrates Next Generation (XG) Wireless Communications System, Sep. 2006.
SSC, Shared Spectrum Company to Demonstrate XG Radio Technology at IEEE Dyspan Conference, Apr. 2007.
SSC, Shared Spectrum Company to Introduce Dynamic Spectrum Access Technology at Wimax Conference, Sep. 2007.
SSC, SSC Products, 2007.
SSC, Thales Communications and Shared Spectrum Company Team to Add Dynamic Spectrum Access Technology to Military Radios, Dec. 2007.
Steadman, Dynamic Spectrum Sharing Detectors, 2nd IEEE International Symposium on New Frontiers in Dynamic Spectrum Access Networks, (DySPAN 2007), Apr. 2007, pp. 276-282.
Steenstrup, Channel Selection among Frequency-Agile Nodes in Multihop Wireless Networks, 2005.
Tenhula, Policy-Based Spectrum Access Control for Public Safety Cognitive Radio Systems, Sep. 2008.
Tenhula, Shared Spectrum Company Successfully Demonstrates Next Generation (XG) Wireless communication System, Sep. 2006.
Tenhula, Update on XG and Follow-on Programs: Cognitive Radio for Tactical and Public Safety Communications, Jun. 2008.
XG Dynamic Spectrum Experiments, Findings and Plans Panel, Dec. 4, 2006.
Zeng, Maximum-Minimum Eigenvalue Detection for Cognitive Radio, IEEE 18th International Symposium on Personal, Indoor and Mobile Radio Communications, (PIMRC'07), Sep. 3, 2007, pp. 1-5.
Zhao, Distributed coordination in dynamic spectrum allocation networks, 2005. First IEEE International Symposium on New Frontiers in Dynamic Spectrum Access Networks, (DySPAN2005), Nov. 8, 2005, pp. 259-268.
Zheng, Device-centric spectrum management, 2005 First IEEE International Symposium on New Frontiers in Dynamic Spectrum Access Networks, (DySPAN 2005). Nov. 8, 2005, pp. 56-65.
Zhou et al., "Detection timing and channel selection for periodic spectrum sensing in cognitive radio" IEEE Global Telecommunications conference, 2008, Nov. 30, 2008, pp. 1-5.
Project: IEEE P802.15 working group for wireless personal area networks (WPANs), pp. 1-25, May 10, 2006.

* cited by examiner

METHODS FOR USING A DETECTOR TO MONITOR AND DETECT CHANNEL OCCUPANCY

FIELD OF THE INVENTION

The present invention relates to monitoring channels to avoid interference with other wireless devices operating over the sane channels. More particularly, the present invention relates to different methods to detect occupancy of the channel designated as a backup channel for wireless transmission sources prior to migration of the sources to the backup channel when the current channel is unavailable.

DESCRIPTION OF THE RELATED ART

Wireless networks enable connectivity between different stations, nodes and the like. The different stations may reside in different locations and operate on frequency channel(s) designated for the network. The number of channel allocations available depends on the total amount of designated spectrum as well as spectrum occupancy.

Some networks are allowed to operate in any channel within the designated frequency spectrum s as long as the channel is not being used. Channels occupied by the transmission sources already operating within the designated spectrum range are to be identified and avoided. The transmissions or signals from these sources may be referred to as non-cooperative transmissions. Other forms of potential interference may arise after the network is established. The network should vacate its channel shortly upon detecting the presence of a non-cooperative transmitter in order to avoid interference. Further, the migration of the network to a new channel should be transparent and seamless such that communications are not impacted.

One solution avoids interference with non-cooperative transmissions by shutting down the network until the frequency channel becomes available. This solution, however, is not feasible as the channel may never become available and the network cannot be offline for any period of time. The network also can transition from the current channel to another designated channel, or backup, channel, unless the backup channel is occupied. Other networks may be using the frequency of the backup channel, and any migration to the frequency would cause problems. Thus, the occupancy of both frequency channels impacts the sustainability of the network.

SUMMARY OF THE INVENTION

Thus, the present invention overcomes the problems within the art discussed above by implementing methods for using a detector to monitor and detect channel occupancy. Preferably, a network operates within a channel at a designated frequency. The network is assigned a backup channel at a different frequency. Upon the detection of non-cooperative communications within the network, the stations within the network vacate the original frequency channel and seamlessly transition operations to the backup channel.

The present invention also seeks to avoid interference with transmissions or other networks within the backup frequency channel. If the backup channel is occupied, then the current network should not migrate to the backup channel to avoid interference with another network or transmission source. The present invention discloses processes and methods to reliably determine occupancy of the backup channel. For example, a detector uses detection intervals to determine whether non-cooperative transmissions exist on the backup channel.

Non-cooperative transmissions may be detected during transmission gaps in the network transmissions. The gaps may be part of a frame structure when the network operates in a framed format. In a framed format, transmission gaps occur repeatedly; the detector is engaged by each active network station and the spectrum measurement is performed during the gap time intervals to monitor spectrum for the presence of non-cooperative signals in its vicinity in the current, or primary, channel and in the backup channel(s).

If a non-cooperative transmission is detected in the primary channel by any participating network station, the network initiates the migration to the backup channel to avoid interference with a detected non-cooperative source. Prior to switching channels, each network station verifies the availability of the backup channel. Successful validation provides increased confidence that the migration to the backup channel will not cause interference.

The proposed verification process involves asynchronous detection such that the spectrum measurement is not performed during the regular transmission gap intervals, or any other periodically scheduled time intervals, within the frame. The verification process is necessary to avoid the situation when the gaps used by the network stations to perform detection measurement are synchronized to the gaps of non-cooperative transmission source(s) operating over the intended backup channel. The situation is common when both channels are occupied by the same type of network. The present invention avoids interference due to the possibility of synchronized transmission gaps.

According to embodiments of the present invention, a method for using a detector is disclosed. The method includes detecting non-cooperative transmissions on a current, or primary, channel. Frame-based periodic detection regions are used to monitor current channel(s) for non-cooperative transmissions. The method also includes scheduling an asynchronous detection interval having a reference within a frame. The method also includes detecting presence of transmissions on a backup channel with the detector during the detection interval.

According to further embodiments of the present invention, another method for using a detector also is disclosed. The method includes detecting interference at a station participating in a network. The network uses a current channel at a first frequency. The method also includes scheduling a start of a detection interval for the detector within a frame over the frequency channel. The method also includes detecting channel occupancy on a backup channel using the detector during the scheduled detection interval. The backup channel uses a second frequency different from the first frequency of the current channel.

According to further embodiments of the present invention, another method for engaging a detector is disclosed. The method includes detecting non-cooperative transmissions on a current channel. The method also includes scheduling a start of a detection interval in a frame using an offset from a reference point within the frame. The offset is selected from a plurality of precomputed offsets. The method also includes detecting non-cooperative transmissions on a backup channel during the detection interval using the detector.

According to further embodiments of the present invention, another method for engaging a detector is disclosed. The method includes detecting non-cooperative transmissions on a current channel. The method also includes scheduling a start of a detection interval using a random offset within a frame. The method also includes detecting non-cooperative transmissions on a backup channel using the detector during the detection interval.

According to further embodiments of the present invention, a method for using a detector to determine availability of a backup channel is disclosed. The act of performing detection for the backup channel involves abandonment of the current channel by the network station and tuning its frequency synthesizer frequency to enable the detector window to overlap the backup channel in the frequency domain for the duration of a detection interval.

BRIEF DESCRIPTION OF THE DRAWINGS

The accompanying drawings are included to provide further understanding of the invention and constitute a part of the specification. The figures listed below illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention. Examples of the preferred embodiments are illustrated in the accompanying drawings.

Figure 1A:
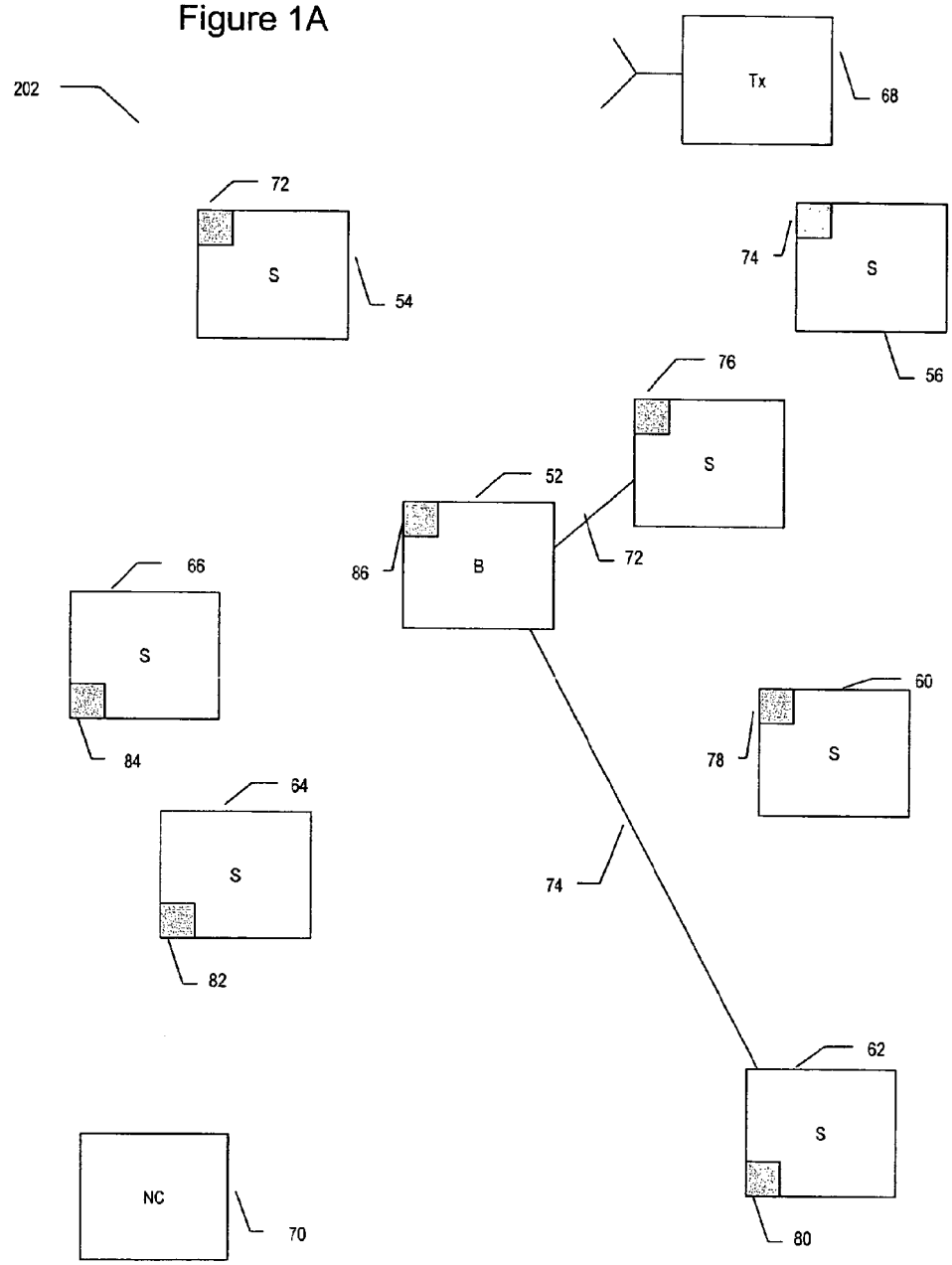
FIG. 1A illustrates a network including stations according to the disclosed embodiments.

FIG. 1A depicts a network 202 including stations according to the disclosed embodiments. Network 202 allows communication and data exchange between the stations. Network 202 is not limited by geography, frequency spectrum or configuration. Network 202 must avoid interfering with other networks or transmitters and operates on a frequency not in use by other transmission sources. Once any interference is detected, network 202 switches from the present operating frequency to another.

Network 202 includes base station 52 and subscriber stations 54, 56, 58, 60, 62, 64 and 66. The number of stations within network 202 is shown for illustrative purposes only. The number of stations within network 202 is not limited to the amount shown in FIG. 1, and may include any number of stations. Further, network 202 is not limited to the configuration shown in FIG. 1, which may be referred to as a hub and spoke configuration. Network 202 may be in any configuration known in the art, and may not necessarily include a base station.

Base station 52 manages network 202 as needed, and may broadcast network information to all the stations. Base station 52 also relays communications between the various subscriber stations. Base station 52 determines when a switchover to a different operating frequency, or frequency channel, is performed based on collective spectrum status information from the participating subscriber stations.

Subscriber stations 54-66 within network 202 may communicate with base station 52 and each other. Subscriber stations 54-66 are located at various distances and directions from base station 52. For example, subscriber station 58 may be located a distance 72 from base station 52. Subscriber station 62 is located a distance 74 from base station 52. Distance 74 is greater in value than distance 72. Other stations are located at different distances from base station 52.

Subscriber stations 54-66 may query base station 52 for various reasons. For example, subscriber stations 54-66 may query base station 52 whether resources are available in network 202.

Each subscriber station is allotted time slots within the frame portion used for to transmit to base station 52. The size of allotted time slot may not be the same for each subscriber station. For example, subscriber station 66 may receive re time in a frame to transmit than subscriber station 60. Base station 52 may allocate the time to the individual subscriber stations according to policies or other considerations. Alternatively, all subscriber stations may receive the same transmit time within a frame.

Subscriber stations 54-66 and base station 52 also include detectors that monitor the occupancy of spectrum available to support network operations. FIG. 1A depicts a detector on each station, but any number of detectors may be located at the stations. Base station 52 includes detector 86. Subscriber stations 54, 56, 58, 60, 62, 64 and 66 include detectors 72, 74, 76, 78, 80, 82 and 84, respectively. Detectors 72-86 need not be identical or operate the same. Detectors 72-86, however, may or may not have sufficient bandwidth, also referred to as effective detector bandwidth or a detector frequency window, to cover the entire spectrum range available to support network operations. Further, detectors 72-86 may be engaged (triggered) to perform detection measurements over detection intervals to detect potential non-cooperative transmission sources.

FIG. 1A also depicts non-cooperative (NC) transmitter 68 and non-cooperative (NC) radio 70, which are not considered part of network 202. Network 202 may interfere with transmitter 68 and NC radio 70 when the stations transmit and receive communications that on the frequency channel used by network 202.

Transmitter 68 may be a television or radio station that transmits signals during certain hours of the day at a specified frequency. The transmission power of transmitter 68 may be large enough to interfere with all stations of network 202, or just enough to interfere with, for example, subscriber stations 54 and 56. In any event, detectors 72 and 74 at stations 54 and 56 will alert base station 52 that a aeon-cooperative transmission source is detected at a frequency region used by transmitter 68 so that appropriate action may be taken. One such action is switching network 202 over to a different frequency NC radio 70 is an authorized radio transmission source that is not a member of network 202. NC radio 70 may be a member of a different network. NC radio 70 may enjoy long periods of time without transmitting any information, and during these periods is transparent to network 202. At certain times, however, NC radio 70 transmits signals with enough power so that it can be detected by members of network 202. If NC radio 70 uses the same channel as network 202, then upon the detection of non-cooperative transmissions originating from NC radio 70, network 202 roust vacate the current frequency channel to avoid interfering with NC radio 70.

Figure 1B:
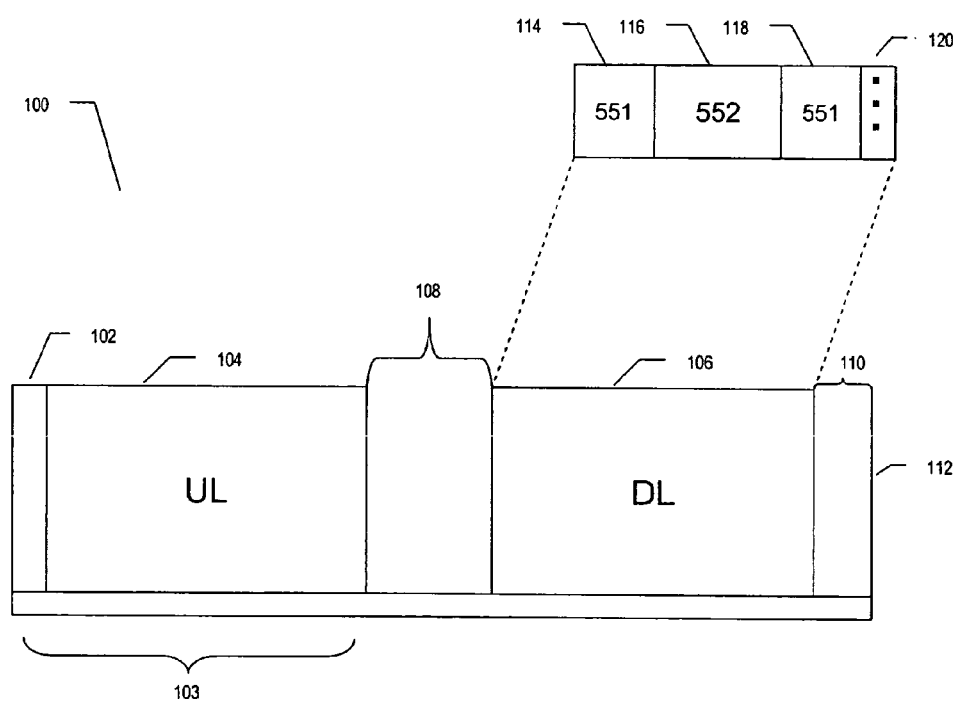
FIG. 1B illustrates a representative frame used by a network according to the disclosed embodiments.

FIG. 1B depicts a time frame format 100 for used by network, such as network 202, according to the disclosed embodiments. Preferably, a frame refers to a periodic structure subdivided into time slots assigned to the stations of network 202 for data transmissions. Certain time slots may be not used for data communications, but support other functionality such as acquisition and tracking or detection.

Referring back to FIG. 1A as an example, network 202 includes a base station 52 and at least one subscriber station. Essentially, frame 100 allows stations to receive and send data at specified intervals within the frame. All stations within network 202, for example, are given the opportunity to transmit information within frame 100.

Uplink sub-frame 103 of frame 100 is comprised of the control slots 102 and communication slots 104 used by base station 52 to transmit information to subscriber stations participating in network 202. Base station 52 uses control slots 102 in every frame to transmit required control information. Base station 52 may use all, some or none of communication slots 104 to send information to subscriber stations 54-66 of network 202. During uplink sub-frame 103, subscriber stations 54-66 do not transmit and are set to receive information from base station 52.

Sub-frame 106 may be referred to as the downlink sub-frame because this portion of frame 100 used by subscriber stations 54-66 to transmit information to base station 52. During sub-frame 106, base station 52 does not transmit but receives information from the participating subscriber stations. Each subscriber station is allocated a portion of sub-frame 106 to transmit.

For example, as depicted in FIG. 1B, sub-frame 106 may be broken into subscriber portions 114, 116, 118 and 120. Subscriber portion 114 corresponds to one subscriber station, such as station 54 in network 202. Subscriber portion 116 corresponds to station 56, subscriber portion 118 corresponds to station 58, and so on. Subscriber portion 120 represents the remaining portions for the rest of the stations, and may be any number. The subscriber portions are not necessarily equal and different stations may have larger time allocations to transmit to base station 52.

While each subscriber station is transmitting, the other stations do not transmit and wait until their allocated portion to start transmission. Thus, only one station at time preferably is transmitting to prevent interference between the transmitting station and other stations within network 202. Base station 52 receives communications from the appropriately scheduled station. For example, subscriber portion 114 corresponds to station 54. During this period, station 54 transmits information to base station 52 and stations 56-66 should not be transmitting. Thus, subscriber stations should transmit during their assigned subscriber portions. At the end of subscriber portion 114, station 54 ceases transmission and subscriber portion 116 starts with station 56 transmitting information.

Other features of frame 100 include transmission gaps 108 and 110. A gap refers to the portion of frame 100 not used for transmission by any network station. Gap 108 is located between sub-frame 104 and sub-frame 106. Gap 110 is located at between sub-frame 106 and end 112 of frame 100.

Figure 2A:
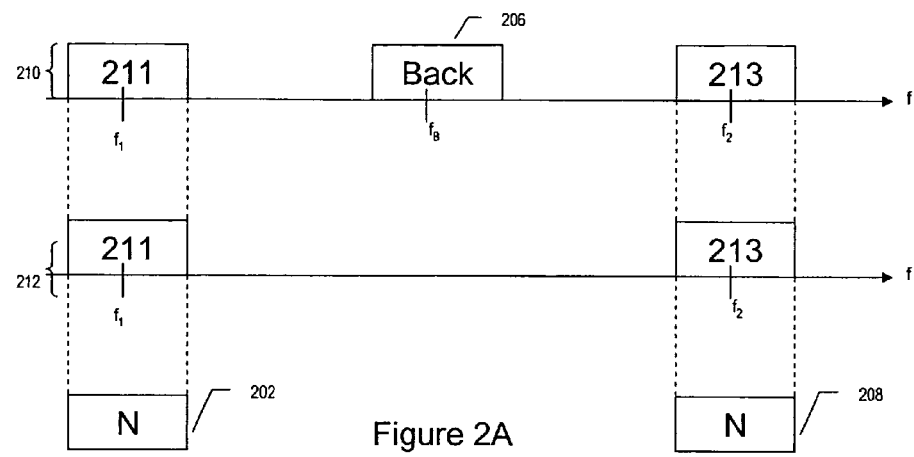
FIG. 2A illustrates a graphical representation of a migration from channel to a backup channel according to the disclosed embodiments.

FIG. 2A depicts graphical representations of switching from a network frequency to a backup channel according to the disclosed embodiments. Bar graph 210 shows current, or primary, channel 211 at frequency f1 used by network 202, backup channel 206 at frequency fb used by network 202 and primary channel 213 at frequency f2 used by a different network 208.

Referring to bar graph 210, a channel at frequency fb is used by network 202 as a backup channel. A backup channel refers to an unoccupied channel at another frequency that is chosen by network 202 for migration to if the current channel network 202 operates on becomes unavailable. Network 202 may migrate from channel 211 to a designated backup channel 206 when a non-cooperative signal is detected by any station participating in network 202 operating on channel 211. Network 202 then continues its operations using new primary channel 206 and a channel at another frequency is designated as a backup channel. Therefore, network 202 does not interfere with any other network or transmitter while operational.

Network 208 operates in a channel 213 at frequency f2 different from the frequencies f1 and fb used by network 202. As shown in bar graph 210, no interference between networks 202 and 208 takes place.

Bar graph 212, however, shows a different scenario when network 208 is operating in a channel designated as a backup channel for network 202. After non-cooperative transmissions are detected by network 202 in channel 211, the migration to backup frequency f2 will cause interference with network 208.

Figure 2B:
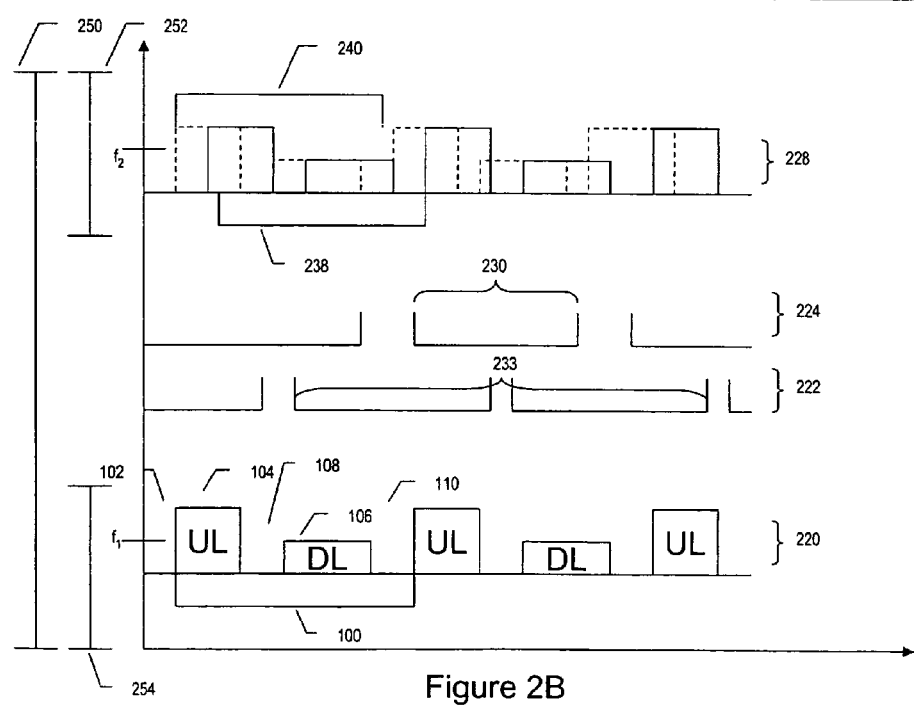
FIG. 2B illustrates time-frequency transmission graphs according to the disclosed embodiments.

FIG. 2B depicts a time-frequency map according to the disclosed embodiments. The bar graphs depict frequency channels for a current network, such as network 202, and a second network, such as network 208. FIG. 2B shows the frame allocations used by these networks and the notional power level of the transmissions within the frames, such as frame 100 shown in FIG. 1B. Further, FIG. 2B shows detection time intervals used by detectors at a base station and at least one subscriber station.

Bar graph 220 represents the frames and notional power levels in the channel at frequency f1 occupied by network 202. Bar graph 220 shows the downlink and the uplink sub-frames for frames, such as frame 100. For example, frame 100 is shown on a time axis for bar graph 220. Frame 100 includes uplink sub-frame 103, downlink sub-frame 106 and gaps 108 and 110. The pattern of frame 100 is repeated over time within network 202.

When non-cooperative transmissions are detected in a channel used by network 202, network 202 migrates to a backup channel without interruption of network operation. Network 202, however, should confirm the absence of any non-cooperative transmissions on the backup channel. If the backup channel is unoccupied, the migration proceeds. If, however, network 208 occupies the backup channel as depicted by bar graph 228, the migration does not take place, thereby preventing network 202 from interfering with network 208.

A detection interval refers to an interval of time within frame 100 that is used by the detector to perform a detection measurement covering a frequency range contained within the detector window. For example, the non-cooperative transmissions may be detected if the signals or energy from a non-cooperative transmission source is detected in the detection window during the detection interval. Following the example, a detector at a station in network 202 detects signals from a transmission source of network 208 at frequency f2, during a detection interval scheduled within gap 108.

If transmission gaps of network 202 are used as detection intervals and do not time overlap with the transmission gaps of network 208, then little or no probability exists that that transmission of network 208 will remain undetected by network 202. Alternatively, if the transmission gaps of network 202 used as detection periods time overlap, or are synchronized, with the transmission gaps of network 208, then network 208 operating at frequency f2 will remain undetected by network 202. Any migration to frequency f2 results in interference with network 208.

The synchronization issue is overcome by implementing asynchronous detection. Detection intervals are scheduled asynchronously to avoid any "blind spots" on the backup channel. Blind spots may be time periods when the non-cooperative transmissions are unobservable to the detector. The detector can control what time intervals used for detection. By shifting detection intervals away from the transmission gaps, network 202 avoids missing detection of network 208 due to gap synchronization.

Examples of detection intervals, also referred to as detection periods, may be seen in bar graphs 222 and 224. Detection measurement is performed over a time interval within the frame. The term triggering may refer to starting the detection measurement at the discrete point in frame 100. The detection interval may last as long as desired or needed to make an accurate measurement.

Bar graph 222 shows detection intervals 232 of a station on network 202. Detection intervals 232 allow a detector at the station of network 202 to detect network 208 transmissions on the backup channel when gap 108 in frame 100 is not synchronized in time with gaps in frame 238. Detection periods 232, however, do not allow a detector at the station of network 202 to detect network 208 transmissions on the backup channel when gap 108 in frame 100 is synchronized in time with gaps in frame 240, as shown by dotted line in 228. Thus, network 208 operates over a channel at frequency f2 and is undetectable by network 202.

By changing detector interval starting points, detection intervals used by a station in network 202 are shifted from the transmission gaps of frame 100 to enable asynchronous detection. Therefore, the detection intervals do not overlap in time with the transmission gaps of frame 240 used by network 208

FIG. 2B also depicts frequency f1 of network 202 and frequency f2 of network 208 within a detector window 250 of the detector, such as detector 72 on subscriber station 54 of FIG. 1A. A detector is able to simultaneously monitor both frequencies only if they fall within the detector window. The station tunes its frequency so that the detector can monitor the channel at frequency f2 for the duration of the detection interval if the frequencies are unobservable in the same detector window used to monitor frequency f1. Thus, the present invention may detect transmissions at frequency channels spanning more than a single detection window.

One restraint on the scheduling of an offset is the region, or portion, of the frame acceptable for the detection interval. These regions may be referred to as eligible detection intervals. One reason for the restraint is that a station cannot transmit and detect at the same time. For example, the detector may not perform detection operations while the station is transmitting during its corresponding sub-frame. Thus, the eligible detection intervals may represent portions of the frame that the station does not transmit and during which the detector may schedule a detection interval.

Figure 3:
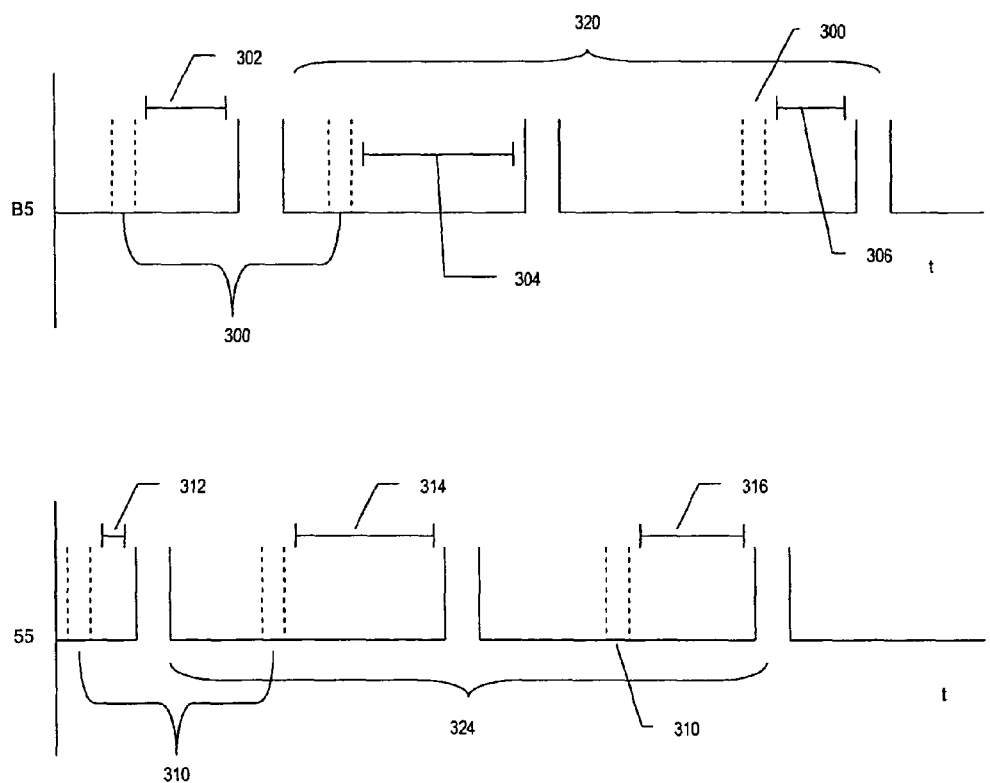
FIG. 3 illustrates a process for the detection of non-cooperative transmissions on a backup channel according to the disclosed embodiments.

FIG. 3 depicts a process for the detecting during detection intervals 300 and 310 by a detector according to the disclosed embodiments. The process of FIG. 3 seeks to avoid the problem of the detector using detection intervals 230 and 232 when synchronized with the frame of the network 208, as shown above. The detector would not detect anything as no transmission or activity is observable on the backup channel during the detection intervals. In this case, a switch to the backup channel, will result in non-cooperative interference to network 208.

FIG. 3 shows a process using offsets to schedule detection periods intervals within frame 100. Thus, the detector will detect interference on the backup channel before migration. Preferably, multiple frames, such as frame 100, are used to monitor and detect transmissions on the backup channel. For example, three (3) frames may be used. More preferably, the offsets are varied in order to cover a wider range of detection intervals that increase reliability of detection of the non-cooperative missions before migration.

For example, the base station, such as base station 52, is configured to enable detection intervals 300. Offsets 302, 304 and 306 are used to determine when to schedule the start of detection intervals 300. Thus, detection intervals 300 are offset from reference points 320 within the frame. Reference points 320 may occur periodically with the frame. Offsets 302, 304 and 306 vary in value so as to stagger detection intervals 300. Thus, the detector schedules detection intervals 300 asynchronously. The detector avoids a repetitive pattern for detection by having different values for the offsets.

For example, offset 306 may be the smallest offset value to position detection intervals 300. Offset 304 may be the largest offset value to position detection intervals 230 further away from its reference point 320. Offset 302 may include a value between offsets 306 and 304 to place its detection interval 300 about midway between reference points 230. Thus, detection intervals 230 are scheduled at three different locations within frame 100. With this coverage, the detector provides results having more confidence that non-cooperative transmissions are not present on the backup channel than then the disclosed synchronous detection routine.

Detection intervals 232 at the station, such as subscriber station 54, are offset in a similar manner. Offsets 312, 314 and 316 are used to position detection intervals 310 from reference points 324. For example, offset 312 may have a small value so that its detection interval 310 is not far away from reference point 324. Offset 314 may have the largest offset value and offset 316 may place a detection interval 310 halfway between reference points 324. Thus, all of detection intervals 310 are scheduled at three different locations in frame 100.

If detection intervals 320 and 324 are staggered by the various offsets, then the detection intervals cover much of frame 100. Preferably, the detector does multiple detection measurements using the offsets after non-cooperative transmissions are detected on network 202. As noted above, the preferred number of detection measurements is three (3).

In addition to the embodiments using a set offset, as disclosed above, other embodiments of the present invention may use random offsets to schedule the detection intervals. Thus, a detection interval is scheduled arbitrarily. The trigger point for each detection measurement is random.

When the primary and backup frequencies are spread beyond the specifications for the detector window, the station uses its transmission allocation in frame 100 to tune its frequency to cover backup channel. The station ceases transmission during its allocated period, buffers the information to be transmitted, tunes its frequency to cover the backup channel in a detection window, uses one of the above-disclosed deterministic or random offset asynchronous detection processes to determine non-cooperative transmissions in the backup channel during its normal transmission period, performs detection measurement, and then tunes its frequency back to the primary frequency. Instead of transmitting information, the station stores the information for transmission later, after the detection is completed.

Figure 4:
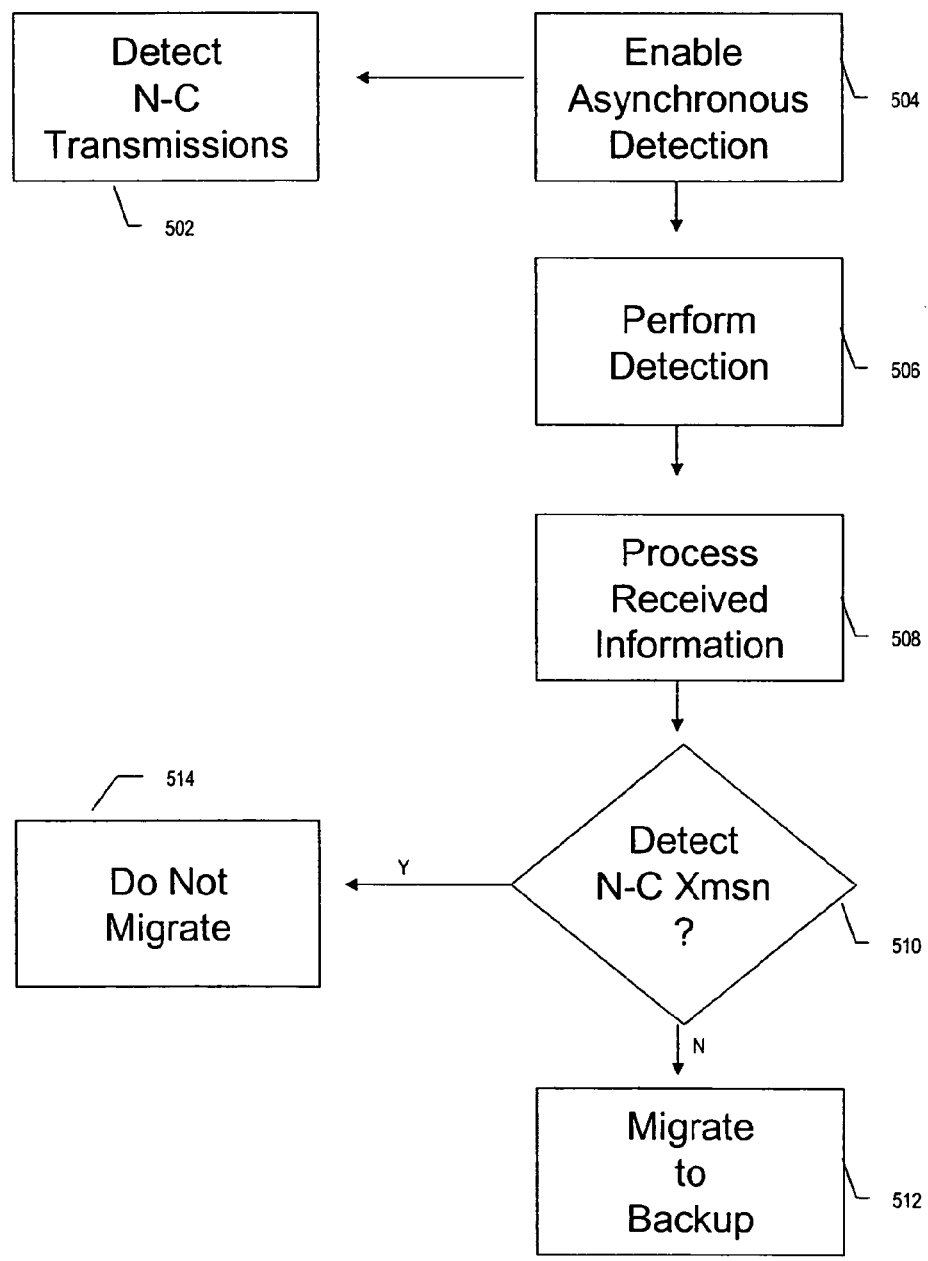
FIG. 4 illustrates a flowchart for monitoring and detecting channel occupancy according to the disclosed embodiments.

FIG. 4 is a flowchart for monitoring and detecting channel occupancy according to the disclosed embodiments. The flowchart shows a process for detecting non-cooperative transmissions on a backup channel. Step 502 executes by detecting the non-cooperative transmissions within the network on the current, or primary, channel, such as network 202 disclosed above. The detecting station may alert the other stations within network 202.

Step 504 executes by enabling an asynchronous detection method. An asynchronous detection method refers to the deterministic or random time offset in scheduling of the detection intervals allowing the detector to detect transmissions on the backup channel. Base station 52 and subscriber stations 54-66, may suspend their typical frame uplink and downlink routine in order to detect potential non-cooperative transmissions on the backup channel for network 202, such as backup channel 206. All the stations actively participating in network 202 must clear the backup channel.

Step 506 executes by performing the detection on the backup channel. This step is disclosed in greater detail below in FIG. 5. A synchronous detection using detection intervals during gaps in the frames, such as gaps 108 and 110 disclosed above may be executed in addition to the methods using asynchronous detection.

Step 508 executes by processing the detection information obtained during asynchronous and synchronous detections. If no transmission sources are detected during the detection interval(s), then the backup channel is declared clear of a non-cooperative transmitter or network, such as network 208. If transmissions sources are detected, then backup channel is declared as unavailable.

Step 510 executes by determining the detection decision. If the decision indicates that "the backup channel is clear", then step 512 executes by proceeding with migration of network 202 to the backup channel at a backup frequency. After migration, a new backup channel on a new backup frequency is selected.

Figure 5:
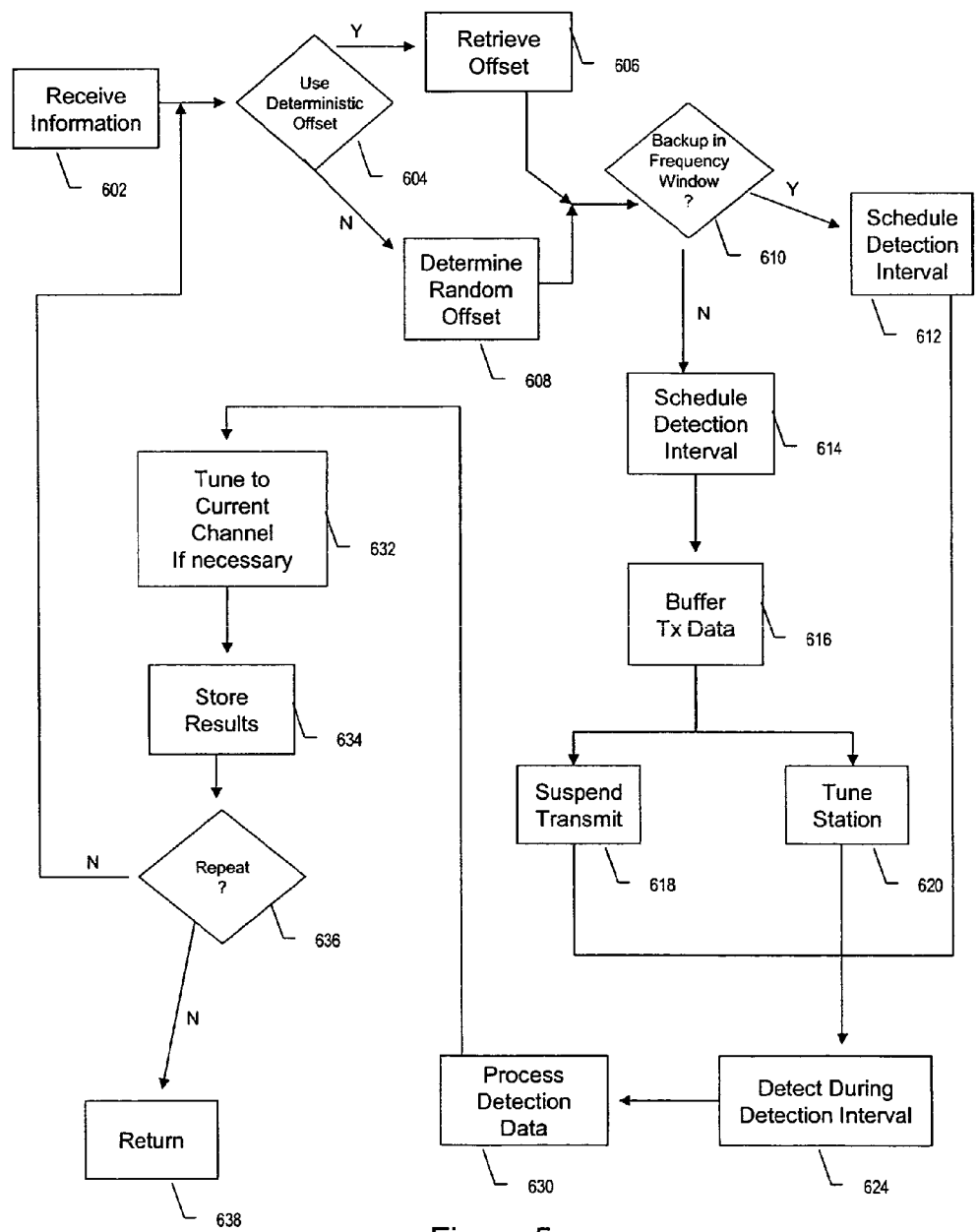
FIG. 5 depicts a flowchart for detecting channel occupancy according to the disclosed embodiments.

FIG. 5 depicts a flowchart for detecting channel occupancy according to the disclosed embodiments. FIG. 5 corresponds to step 506 in FIG. 4. FIG. 4, however, is not limited by the embodiments disclosed by FIG. 5. Further, FIG. 5 is not limited by FIG. 4. FIG. 5 discloses some of the different methods for determining whether a frequency channel is occupied.

Step 602 executes by receiving an instruction from the applicable station to perform detection on a backup channel because the station detected non-cooperative transmissions or directed to do so by the network control entity such as, for example, the base station. For example, a station, such as station 54, detects interference on current frequency f1 and instructs its detector to determine channel occupancy of the backup channel. Alternatively, the instruction is received from a base station or other station in network 202 to perform the detection.

Step 604 executes by determining whether the detection method desires the use of a deterministic or random offset in scheduling of the detection intervals. A deterministic offset refers to a pre-scheduled setting of the start time of the detection intervals during the asynchronous detection. The detector or station may want to deterministically control when the detection intervals occur. Random offset refers to random setting of the start time of the detection intervals during asynchronous detection.

If step 604 is yes, then step 606 executes by retrieving the offsets used to schedule the start of the detection periods. An offset is selected from a set of offsets. Each offset may have a different "value" in that they are do not provide the same offset for the detection intervals. Referring to FIG. 3, offsets 302, 304 and 306 determine the detection intervals for a base station and offsets 312, 314 and 316 determine the detection intervals for a detector on a subscriber station.

The offsets may be set according to a desired pattern to detect over as many different points in a frame as possible. The offsets may be set by software on the station, but may not have the same value. In other words, the offsets vary the amount "offset" from a reference point within the frame.

If step 604 is no, then random scheduling of the detection intervals is to be used. Step 608 executes by randomly determining offsets for the start of the detection intervals. Thus, the detection intervals are randomly positioned to allow the detector to detect any non-cooperative transmissions or signals on the backup channel. The random offsets are positioned from the reference points within the frame.

Step 610 executes by determining whether the backup channel for the current network is within the same detector frequency window as the primary channel. For example, detector 74 at subscriber station 56 should determine whether backup frequency fb is detectable in the detector frequency window when tuned to operate at frequency f1. If not, then the detector suspends transmissions and tunes the station to include backup frequency fb in the detector frequency window, as disclosed below.

If step 610 is yes, then step 612 executes by scheduling the detection intervals using the offsets. Step 612 schedules the detection intervals by offsetting their start from at least one reference point within the frame(s). The regions allowable for detection intervals depend on a few variables, such as type of station, transmit or receive status, and the like.

If step 610 is no, then step 614 executes by scheduling the detection intervals using the offsets in the transmission sub-frame of the station. Step 614 schedules the detection intervals by offsetting their start from at least one reference point within the frame(s). The regions allowable for detection intervals depend on a few variables, such as type of station, transmit or receive status, and the like.

Step 616 executes by buffering the data normally scheduled to be transmitted during the applicable frame interval(s) when they are not used as detection interval(s). If the station is one or more of subscriber stations 54-66, for example, then the data scheduled for transmission during the downlink, or sub-frame 106, portion is buffered. A subsequent frame(s) transmits the buffered data during its normal downlink or uplink time.

Step 618 executes by suspending transmit operations for the appropriate portion of frame 100. As with the buffered data, the transmission at the station is suspended so that the station can tune onto a frequency to encompass the backup channel and perform a detection measurement. For example, base station 52 includes detector 86. Base station 52 transmits during sub-frame 104 in normal operations. In step 618, however, transmission is suspended during sub-frame 104 which enables detection operations on the backup channel. Step 620 executes by tuning the station to frequency so that the detector window encompasses the frequency fb of the backup channel.

Step 624 executes by detecting the presence of non-cooperative transmissions, or signals, on the backup channel using the detector during the detection interval. The detection intervals occur and allow the detector to detect, or measure, any non-cooperative transmissions on the backup frequency channel to determine if the channel is occupied.

Step 630 executes by tuning the station back to the current if applicable. If steps 606-610 were not executed, then step 630 is skipped. Step 632 executes by processing the detection data taken by the detector.

Step 634 executes by storing the detection results for the detection intervals. The stored data may be used for processing and determining whether the backup channel is occupied. Step 636 executes by determining whether to repeat the process of scheduling a detection interval and detecting transmissions on the backup channel. As disclosed above, the detector may desire multiple sets of measurements for a more confident estimation of channel occupancy. Preferably, three sets of measurements are taken before determining whether to migrate. Thus, on the third time through steps 612-632, step 636 may be "NO" to indicate the end of the process.

Step 638 executes by returning control of the flowchart back to the migration process of the station. The stored information on what was detected on the backup channel during the detection intervals may be used to determine whether the backup channel is occupied by another network or transmitter that would be interfered with by the current network.

Thus, the present invention discloses various methods and process for monitoring channels and frequencies. The station of the network detects non-cooperative transmission on its current frequency. Before switching the network over to the backup frequency, the present invention performs detections on the backup channel to verify if it is not occupied. Using an occupied channel will causes interference with the wireless devices actively operating at that channel. The present invention may use one of the above-disclosed methods to detect non-cooperative transmission sources active on the backup channel.

The principles and scope of the present invention will be apparent to those skilled in the art. Further, various modifications and variations can be made in the disclosed embodiments without departing from the spirit of the invention. Thus, the present invention covers the modifications and variations of the preferred embodiments disclosed above provided that they come within the scope of any of the claims or their equivalents.

The invention claimed is:

1. A method of operating a device comprising: a scheduler, a first transceiver, and a second transceiver, the method comprising:
   operating the first transceiver to send and receive packets on a first frequency during a first time period;
   disabling operation of the second transceiver to send and receive packets on a second frequency different from the first frequency;
   configuring the second transceiver as a detector with a receiver portion of the second transceiver;
   tuning the detector to a third frequency different from the first frequency;
   monitoring, with the detector, for a presence and an absence of transmissions on the third frequency;
   classifying received information from the detector about the presence and the absence of transmissions on the third frequency; and
   operating the first transceiver based on activity on the third frequency detected by the detector.

2. The method of claim 1, further comprising:
   disabling operation of the first transceiver for transmission during a second time period, wherein the step of monitoring, with the detector, is performed during the second time period.

3. The method of claim 2, further comprising synchronizing the second time period among all of a plurality of remote transceivers.

4. The method of claim 2, further comprising:
   receiving a message indicating a time frame format that includes information related to a starting time of the second time period with respect to a reference.

5. The method of claim 4, wherein the message indicating the time frame format includes information related to a duration time of the second time period.

6. The method of claim 4, wherein the message indicating the time frame format includes information related to an offset time of the second time period with respect to a reference.

7. The method of claim 4, wherein the reference occurs asynchronously within each of a plurality of frames.

8. The method of claim 2, wherein the second time period is synchronized with a plurality of transceivers remote from the device comprising the first and second transceivers.

9. The method of claim 2, wherein the second time period occurs asynchronously within each of a plurality of frames.

10. The method of claim 1, wherein operating the first transceiver based on activity on the third frequency detected by the detector comprises enabling or disabling operation of the first transceiver to transmit on the third frequency.

11. A device comprising:
    a first transceiver; and
    a second transceiver;
    wherein the device is configured to:
       operate the first transceiver to send and receive packets on a first frequency during a first time period;
       disable operation of the second transceiver to send and receive packets on a second frequency different from the first frequency;
       configure the second transceiver as a detector with a receiver portion of the second transceiver;
       tune the detector to a third frequency different from the first frequency;
       monitor, with the detector, for a presence and an absence of transmissions on the third frequency;
       classify received information from the detector about the presence and the absence of transmissions on the third frequency; and
       operate the first transceiver based on activity on the third frequency detected by the detector.

12. The device of claim 11, wherein the device is further configured to disable operation of the first transceiver for transmission during a second time period, wherein monitoring, with the detector, is performed during the second time period.

13. The device of claim 12, wherein the device is further configured to synchronize the second time period among all of a plurality of remote transceivers.

14. The device of claim 12, wherein the device is further configured to receive a message indicating a time frame format that includes information related to a starting time of the second time period with respect to a reference.

15. The device of claim 14, wherein the message indicating the time frame format includes information related to a duration time of the second time period.

16. The device of claim 14, wherein the message indicating the time frame format includes information related to an offset time of the second time period with respect to a reference.

17. The device of claim 14, wherein the reference occurs asynchronously within each of a plurality of frames.

18. The device of claim 12, wherein the second time period is synchronized with a plurality of transceivers remote from the device comprising the first and second transceivers.

19. The device of claim 12, wherein the second time period occurs asynchronously within each of a plurality of frames.

20. The device of claim 11, wherein the device is configured to operate the first transceiver based on activity on the third frequency detected by the detector by enabling or disabling operation of the first transceiver to transmit on the third frequency.

* * * * *